Nov. 4, 1952  A. E. OLSON  2,616,580
FORK LIFT TRAILER
Filed July 29, 1949  2 SHEETS—SHEET 1
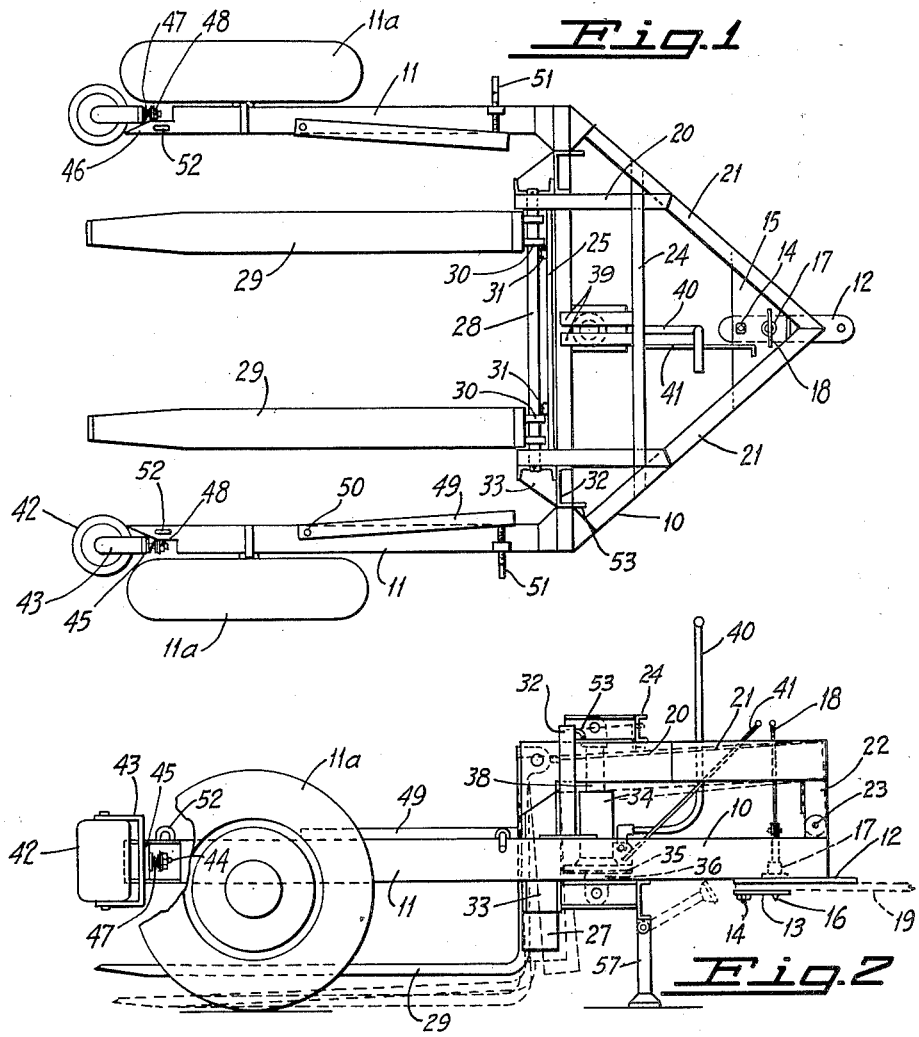
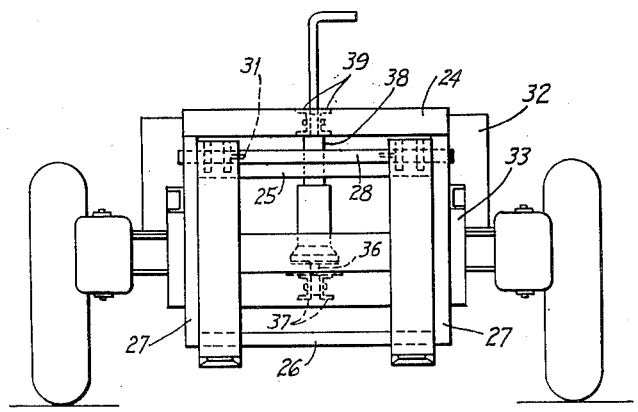
INVENTOR.
ARTHUR E. OLSON
BY
*Naylor and Lassegne*
ATTORNEYS Nov. 4, 1952 A. E. OLSON 2,616,580
FORK LIFT TRAILER Filed July 29, 1949 2 SHEETS—SHEET 2

INVENTOR.
ARTHUR E. OLSON
BY
Naylor and Lanagne
ATTORNEYS

Patented Nov. 4, 1952

2,616,580

UNITED STATES PATENT OFFICE 2,616,580

FORK LIFT TRAILER

Arthur E. Olson, Cupertino, Calif.

Application July 29, 1949, Serial No. 107,462

2 Claims. (Cl. 214—131)

This invention relates to vehicles embodying load lifting means and more particularly to a two wheel trailer truck for coupling to a farm tractor and constructed to lift and transport containers of a harvested crop from the orchard or field.

In the process of harvesting certain crops, such, for instance, as tree grown fruit, it is the practice to put the fruit in so-called lug boxes of uniform size and shape convenient for carrying and for manual lifting and loading onto a standard type wagon or truck for transport from the orchard. This manner of handling the full lug boxes is obviously laborious and time consuming and a manner of loading and transport which eliminates the necessity of lifting the boxes onto a truck or wagon body and thereafter stacking and securing them thereon for safe transport has been much desired.

Therefore, the main object of the present invention is to provide means for mechanically lifting and transporting stacked lug boxes from an orchard or field without requiring the above manual loading and securing process, the lug boxes being stacked at convenient locations between tree rows and preferably on pallets which are picked up with the stack.

Another object of the invention is to provide a trailer type lift truck having lifting means designed to be passed under a pallet and stack of lug boxes by backing the tractor and truck to the stack and having means for automatically correcting any minor mis-alignment of the truck and lifting means as the load is engaged.

A further object of the invention is to provide load securing means on the truck which will operate automatically to tie down or secure the stacked lug boxes as the stack is being lifted for transport.

With the above and other objects and advantages in view which will become apparent from the detailed description to follow, the invention is disclosed as embodied in the trailer type lift truck and load securing means hereinafter specifically described and illustrated in the accompanying drawings, where Figure 1 is a plan view of the trailer type lift truck;

Figures 2 and 3 are side and rear elevations of same, respectively, with the extreme lowered position of the lift indicated by dotted lines on Figure 2;

Figure 5:
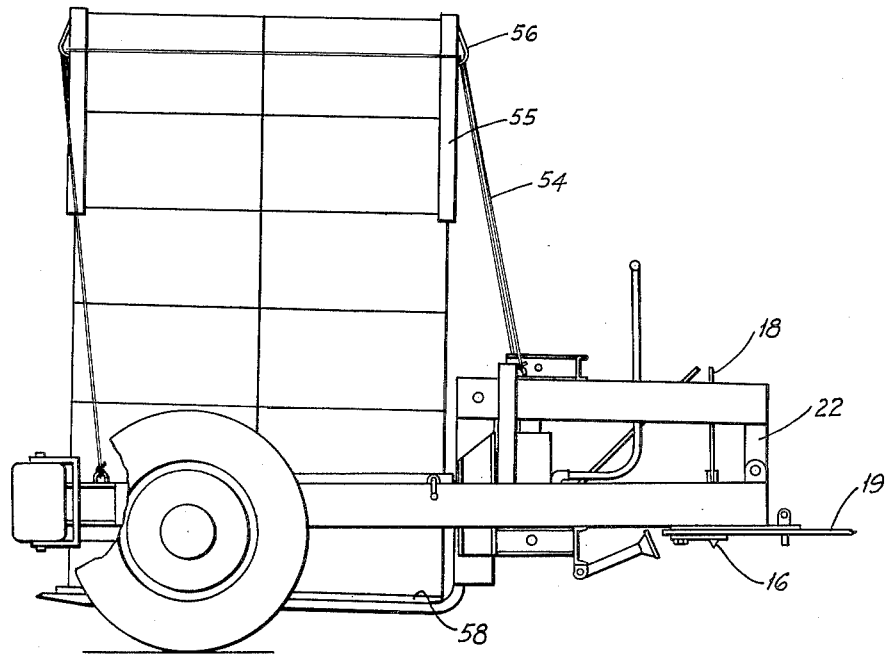
Figure 5 is a similar view showing the lifted and secured stack.

In the particular construction illustrated, the trailer truck comprises a main frame consisting of the V-shaped forward portion 10 comprising suitable transverse brace members and having parallel rearwardly extending arms 11 rigid therewith on which the carrying wheels 11a are mounted at the outer sides. At the apex of the V-shaped portion there is a fixed tractor hitch or clevis bar 12 with its forward end projecting and formed with an opening for a coupling pin. Below the rear portion of clevis bar 12 a shorter bar 13 is mounted in spaced relation thereto as by a suitable spacer and bolt at 14 (Figures 1 and 2) which bolt also secures the two clevis bars to a gusset plate 15 at the apex of the converging members of frame 10. The spaced clevis bars and the gusset plate are formed with vertically aligned openings receiving a slidable locking pin 16 mounted in a bearing collar 17 surrounding the opening in gusset plate 15. A suitable operating link and handle 18 connected to locking pin 16 extends upwardly to within reach of an operator on a tractor coupled to the trailer. The purpose of the forward and rear coupling pin openings in the clevis bars and of locking pin 16 is to permit the draw-bar of a tractor, indicated in dotted lines at 19 in Figure 2, to be either pivotally or rigidly coupled to the trailer for a reason to be hereinafter given.

The main frame described carries a supplemental lifting frame consisting of a forward frame portion lying above the V-shaped front of the main frame and having short parallel side bars 20 merging into converging bars 21 which extend forwardly above and in the vertical planes of the frame bars 10. At the apex of the bars 21 there is welded or otherwise secured a short depending bar 22 the lower end of which is supported on a transverse pivotal connection with the apex of main frame member 10 at 23. The forward portions of side bars 20 are connected by a crossbar 24 welded to the upper sides of bars 20. At the rear ends the bars 20 are fixedly secured to a rectangular vertically disposed rigid frame made up of an upper cross-bar 25 connecting bars 20 near the ends, a lower cross-bar 26 and lateral bars 27. The ends of bars 20 just beyond cross-bar 25 support a cross-shaft 28 on which are pivotally suspended the vertical portions of a pair of laterally spaced angular lifting fork arms 29 the upright portions of which normally contact cross-bars 25, 26 of the lifting frame by which swinging of the arms is restricted. Suspension of the fork arms is preferably effected by means of apertured pivot ears 30 secured to the upper ends of the vertical arms of the forks and journalled on shaft 28 where they are retained against movement longitudinally of the shaft by stop lugs 31 on cross-bar 25, or the like. To guide the supplemental lifting frame in its vertical movement the main frame is provided with vertical posts 32, shown as channel bars, having one web contacting frame bars 20 and also with secondary guide members 33 contacting the lateral members 27 of the fork carrying frame.

The lifting and lowering means for the supplemental lifting frame is preferably hydraulic and is shown as consisting of the hydraulic cylinder 34 secured to a base plate 35. The base plate is provided with a short depending pivot lug 36 pivotally mounted between a pair of supporting bars 37 connecting the two cross members of the main frame centrally thereof. The piston rod 38 extends upwardly and has a terminal pivot head pivotally mounted between twin central frame bars 39 extending between cross bar 24 and the upper edge of cross bar 25. Suitable fluid pumping and release valve mechanism of any standard type is carried on base plate 35. Pressure to project the piston arm and elevate the lifting frame is applied by means of the goose neck pump lever and handle 40 and a pull link 41 serves to actuate a fluid release valve for lowering the lift frame. By actuation of the lift described, the lifting frame and fork arms may be moved from full line raised position of Figure 2 to the extreme lowered position indicated in dotted lines. As the upright portions of fork arms 29 are pivotally hung on shaft 28 they can swing away from the vertical portion of the lifting frame to bring the arms 29 level with the ground surface, as shown, to facilitate passage of the arms under a pallet before the lift is operated.

Stacked lug boxes resting on a pallet and forming a rectangular body are engaged and loaded on the fork arms 29 and moved between the frame arms 11 by backing the trailer to the load. As alignment of the fork arms and side arms with the stack may be imperfect, vertically disposed rollers 42 are provided on the ends of side arms 11 in position to engage the sides of the lug stack and guide the load between the arms. These rollers are mounted in bearing forks 43 provided with posts 44 passed through an aperture in the vertical ears 45 on the outer surface of a terminal reduced portion 46 of the arms 11. Beyond ears 45 the posts 44 carry coil springs 47 which are compressed between the ears and a nut 48 on the threaded end of the posts. This permits the rollers 42 to yield outwardly to some degree to accommodate the load and assist in holding it in position.

Figure 4:
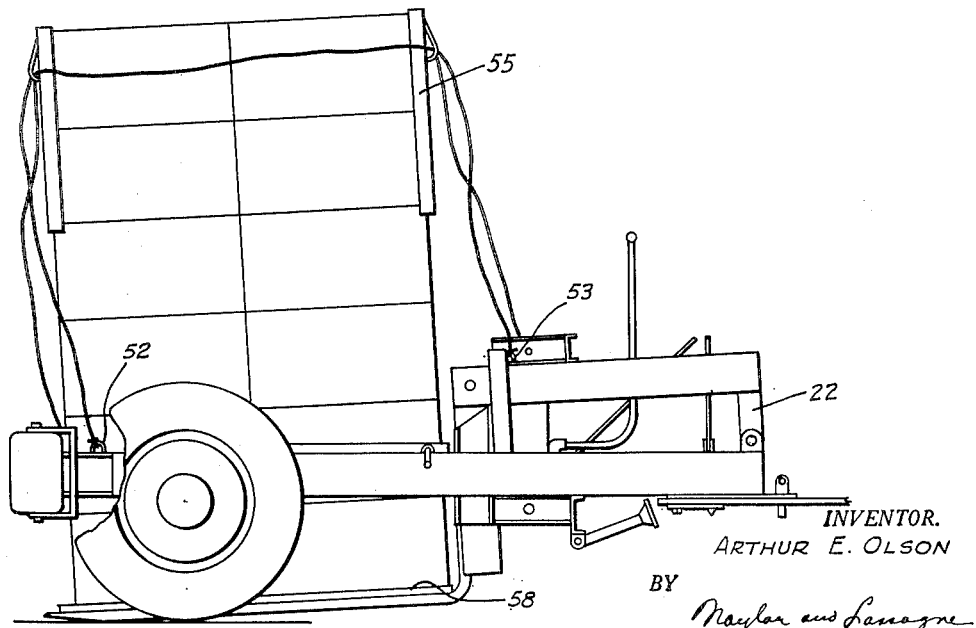
Figure 4 is a side elevation showing the lug box stack and securing means as they appear just prior to lifting.

It will be evident that a rectangular stack such as the load of lug boxes illustrated in Figures 4 and 5 would tend to fall apart or drop some of its units during transport if not securely held. To prevent any movement of the load after lifting and during transport the side arms 11 are each provided with a clamping bar 49 pivoted to the upper side of the arm at 50 and movable towards a load in the space between the arms by means of a screw-crank 51 journaled across the arm and engaging the side of clamp bar 49. In addition to the clamp bars the main frame is provided with anchor loops 52 on the ends of side arms 11 and complemental anchor hooks 53 on the upper ends of guide standards 32 and these serve as connections or anchors for a pair of opposite binding cables 54 shown in Figures 4 and 5. For cooperation with these cables, four angle bars 55 are provided. These are closed at the upper ends by webs adapted to abut the top corners of the rectangular load and retain the bars in position. Each of the bars 55 has a cable eye 56 near its upper end for receiving the cables 54 on the opposite sides of the load. Each cable has one end secured to loops 52 and carries two of the angle bars 55. Prior to actuation of the lift each pair of bars is hung on the corners of the opposite sides of the load and the other end of each cable is secured to a hook 53 with the cables slack. This condition is illustrated by Figure 4. Upon actuation of the lift the cables will become taut, as illustrated in Figure 5, and at the same time the angle bars will be securely clamped on the corners of the load.

To support the front of the trailer when same is not coupled to and supported by a tractor draw-bar a pivotally mounted foot 57 may be provided which can be swung up and latched or otherwise held in upturned position when not in use.

In the loading and transport of lug boxes or the like in connection with the lifting trailer of the present invention, it is the practice to place suitable pallets, indicated at 58 in Figures 4 and 5, which conform in size to the space defined by arms 11 and the length of fork arms 29 on the ground in convenient locations, such pallets being designed to admit insertion of the fork arms 29 under them. As the lug boxes are filled, they are placed in stacked relation on the pallets to form rectangular stacks such as seen in Figures 4 and 5. When a stack is ready to be transported, the lifting trailer is backed towards the stack and positioned so that its side arms 11 are brought into substantial alignment with opposite sides of the stack. The hitch or coupling between the trailer and tractor is then preferably made rigid by use of coupling pins in both the front and rear apertures of the clevis bar 12 and the trailer then backed to the stack in a straight path with fork arms 29 passing under the pallets 58 and the end rollers 42 on arms 11 travelling on the sides of the stack until the fully engaged position of the stack illustrated by Figure 4 is reached. The pivoted clamp bars 49 are then made to contact the stack sides and the bars 55 are hung or positioned on the four upper corners. The cables carried by the eyes 56 of the bars have the ends thereof fastened to the anchor loops and hooks 52, 53 in such manner as to leave the cables with a predetermined amount of slack or yield, as in Figure 4. Any suitable means, such as a length of chain links for selectively hooking over anchor hooks 53, may be provided on one end of the cables for adjusting the amount of cable slack desired. After engagement of the stack load by the trailer and application of the stack clamping means, the hydraulic lift is actuated by means of handle 40 until the cables 54 are taut and the stack raised clear of the ground, as in Figure 5. The stack can then be transported without risk of slippage or overturn and deposited wherever desired by reversing the securing and loading steps above described.

The construction above described is an example of one practicable embodiment of the invention, and it will be obvious to those familiar with loading and transport of certain gathered crops from the orchard or field that various structural modifications and substitutions could be made without departure from the principle of the invention and the scope of what is claimed as new.

What is claimed is:

1. A trailer lift truck comprising a main frame having a forward portion and laterally spaced horizontal side arms extending rearwardly therefrom, supporting wheels mounted on said arms, means on the forward portion of the main frame for supporting it in substantially horizontal position in cooperation with said wheels, a supplemental lifting frame having a forward portion positioned above the forward portion of the main frame and pivoted on a horizontal axis to the forward end thereof, load lifting fork arms having vertical portions suspended from the supplemental frame between the side arms and horizontal portions coextensive with the side arms and adapted to be positioned at the level of the wheel treads, guide means on the ends of the side arms for aligning a load being received between the side arms, and means on the inner portions of the arms for clamping the sides of a load.

2. A lift truck comprising a wheel supported main frame, a supplemental lifting frame connected to the main frame for vertical movement, said frames having load receiving members cooperating to receive rectangular loads, manually controllable lift mechanism between the frames, and load retaining means on the main frame comprising cables at opposite sides of the main frame having connections therewith fore and aft of the load receiving space and each carrying a pair of slidably mounted angle bars thereon, each pair of bars being adapted to engage the corners at opposite sides of a rectangular load on the lifting frame prior to actuation of the lift, said cables becoming taut to clamp the angle bars to a load upon actuation of the lift mechanism.

ARTHUR E. OLSON.

REFERENCES CITED

The following references are of record in the file of this patent:

UNITED STATES PATENTS

| Number | Name | Date |
|---|---|---|
| 1,900,569 | Lederer | Mar. 7, 1933 |
| 2,178,368 | Dunham | Oct. 31, 1939 |
| 2,230,014 | Raven | Jan. 28, 1941 |
| 2,281,012 | Sears | Apr. 28, 1942 |
| 2,364,918 | Roberson | Dec. 12, 1944 |
| 2,400,312 | Miller | May 14, 1946 |
| 2,437,982 | Tietsema | Mar. 16, 1948 |
| 2,449,146 | Ryan | Sept. 14, 1948 |
| 2,479,758 | McDermott | Aug. 23, 1949 |
| 2,479,841 | Jordan | Aug. 23, 1949 |
| 2,492,608 | Wilms | Dec. 27, 1949 |
| 2,520,564 | Reagle | Aug. 29, 1950 |

FOREIGN PATENTS

| Number | Country | Date |
|---|---|---|
| 781,794 | France | Mar. 4, 1935 |